United States Patent
Lai et al.

(10) Patent No.: US 12,023,677 B2
(45) Date of Patent: Jul. 2, 2024

(54) SAMPLE TUBE FOR POLYMERASE CHAIN REACTION AND POLYMERASE CHAIN REACTION DEVICE THEREOF

(71) Applicant: Credo Diagnostics Biomedical Pte. Ltd., Singapore (SG)

(72) Inventors: Ying-Ta Lai, New Taipei (TW); Yu-Cheng Ou, New Taipei (TW); Jim-Yi Liao, New Taipei (TW); Yi-Hsi Chen, New Taipei (TW)

(73) Assignee: Credo Diagnostics Biomedical Pte. Ltd., Singapore (SG)

( * ) Notice: Subject to any disclaimer, the term of this patent is extended or adjusted under 35 U.S.C. 154(b) by 989 days.

(21) Appl. No.: 16/995,839

(22) Filed: Aug. 18, 2020

(65) Prior Publication Data

US 2021/0394176 A1 Dec. 23, 2021

(30) Foreign Application Priority Data

Jun. 23, 2020 (TW) ................... 109121302

(51) Int. Cl.
*B01L 3/00* (2006.01)

(52) U.S. Cl.
CPC ........... *B01L 3/5082* (2013.01); *B01L 3/5635* (2013.01); *B01L 3/50851* (2013.01); *B01L 2300/0609* (2013.01)

(58) Field of Classification Search
CPC .. B01L 3/508; B01L 3/5082; B01L 2300/042; B01L 2300/046; B01L 2300/0609; B01L 2300/0851; G01N 21/0303; G01N 2021/6482
See application file for complete search history.

(56) References Cited

U.S. PATENT DOCUMENTS

| | | | |
|---|---|---|---|
| 2004/0258563 A1* | 12/2004 | Young ................. | C12Q 1/6806 422/400 |
| 2007/0054291 A1* | 3/2007 | Van Camp ....... | G01N 33/54373 435/6.12 |
| 2008/0194014 A1 | 8/2008 | Young | |
| 2013/0107267 A1* | 5/2013 | Leuenberger .......... | G01N 21/85 356/445 |

(Continued)

FOREIGN PATENT DOCUMENTS

| | | |
|---|---|---|
| CN | 101712924 A | 5/2010 |
| CN | 104520711 B | 9/2017 |
| CN | 207891342 U | 9/2018 |

(Continued)

*Primary Examiner* — Jill A Warden
*Assistant Examiner* — Dwayne K Handy
(74) *Attorney, Agent, or Firm* — Winston Hsu

(57) ABSTRACT

The present invention provides a sample tube for polymerase chain reaction. The sample tube includes a sample tube body having an annular side wall and a bottom wall connected to annular side wall, wherein the annular side wall and the bottom wall form an accommodating space for accommodating a reaction mixture; and a first extension member extending from the bottom wall to the accommodating space, wherein, to carry out PCR, the reaction mixture immerses the first extension member, such that the light from the light source enters into the reaction mixture via the bottom and the bottom wall of the sample tube and the first extension member sequentially.

10 Claims, 3 Drawing Sheets

(56) References Cited

U.S. PATENT DOCUMENTS

2015/0231630 A1    8/2015   Chow
2016/0017267 A1*   1/2016   Hansen .................. C12M 41/36
                                                          435/29

FOREIGN PATENT DOCUMENTS

| CN | 209722143 U | 12/2019 |
|---|---|---|
| CN | 111117869 A | 5/2020 |
| DE | 10 2013 215 210 B3 | 10/2014 |
| JP | 60-154858 U | 10/1985 |
| JP | 2007-521485 A | 8/2007 |
| KR | 10-2019-0097336 A | 8/2019 |
| TW | 1427143 B | 2/2014 |
| TW | 1656335 B | 4/2019 |
| WO | 2016/006362 A1 | 1/2016 |
| WO | 2018/051804 A1 | 3/2018 |

* cited by examiner

SAMPLE TUBE FOR POLYMERASE CHAIN REACTION AND POLYMERASE CHAIN REACTION DEVICE THEREOF

CROSS REFERENCE TO RELATED APPLICATION AND CLAIM OF PRIORITY

This application claims the benefit of Taiwan Patent Application No. 109121302, filed on Jun. 23, 2020, at the Taiwan Intellectual Property Office, the disclosures of which are incorporated herein in their entirety by reference.

BACKGROUND OF THE INVENTION

1. Field of the Invention

The present invention relates to a sample tube for polymerase chain reaction (PCR) and a PCR device thereof, and more particularly, to a sample tube for PCR and a PCR device thereof capable of increasing heating area, avoiding bubble formation, adjusting reagent volumes and guiding excitation beam.

2. Description of the Prior Art

Polymerase chain reaction (PCR), a DNA amplification, is an important technique in molecular biology. Typically, PCR is carried out for 20 to 35 cycles, each of which includes following 3 steps: (1) denaturation: separating double-stranded DNA at a high temperature (94-96° C.); (2) annealing: reducing temperature (68° C.) so that each primer can bind to a single-strand DNA after the double-strand DNA separation; and (3) elongation: after heating to 72° C., DNA polymerase starts to synthesize a complementary strand along the DNA strand where the primer bound therefrom. A real-time polymerase chain reaction (RT-PCR) is directed to simultaneously perform DNA amplification and quantitative analysis in a sample analyte container after the DNA amplificationis performed. The quantitative analysis after the DNA amplification is carried out to separate fluorescent signals of the excited analytes into multiple different optical paths, and to filter multiple signals in different frequency bands through multiple band-pass filters for analysis.

Conventional PCR sample tubes are single sample tubes ora strip of sample tubes, and sample tube openings are sealed by sample tube covers or a strip of sample tube covers (and both sample tube covers are separated from sample tube bodies). Reaction mixture is added into an accommodating space of the conventional PCR sample tube, and there is air between a surface of the reaction mixture and the sample tube cover. Because the contact area between the reaction mixture and the air in the conventional PCR sample tube is large, after dozens of heating and cooling cycles in the wells of the PCR reaction device, the reaction mixture is prone to disturbances at high temperature and thus bubbles are generated, thereby causing optical noises and affecting the efficiency of PCR.

In view of this, there is a need for improvement of structure of the conventional PCR sample tube.

SUMMARY OF THE INVENTION

It is therefore an objective of the present invention to provide a sample tube for polymerase chain reaction (PCR) and a PCR device thereof capable of increasing heating area, avoiding bubble formation, adjusting reagent volumes and guiding excitation beam.

The present invention discloses a sample tube for a polymerase chain reaction (PCR). The sample tube includes a sample tube body having an annular side wall and a bottom wall connected to the annular side wall, wherein the annular side wall and the bottom wall form an accommodating space for accommodating a reaction mixture; and a first extension member extending from the bottom wall to the accommodating space, wherein the reaction mixture immerses the first extension member during the PCR, such that a light beam of the light source enters the reaction mixture via the bottom and the bottom wall of the sample tube and the first extension member sequentially.

The present invention further discloses a sample tube. The sample tube includes a sample tube body, having an accommodating space for accommodating a reaction mixture; and a first extension member, extending from a bottom of the sample tube body to the accommodating space, wherein a light beam of a light source enters the reaction mixture via the bottom and the first extension member sequentially.

The present invention further discloses a polymerase chain reaction device. The polymerase chain reaction device includes the above sample tube.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
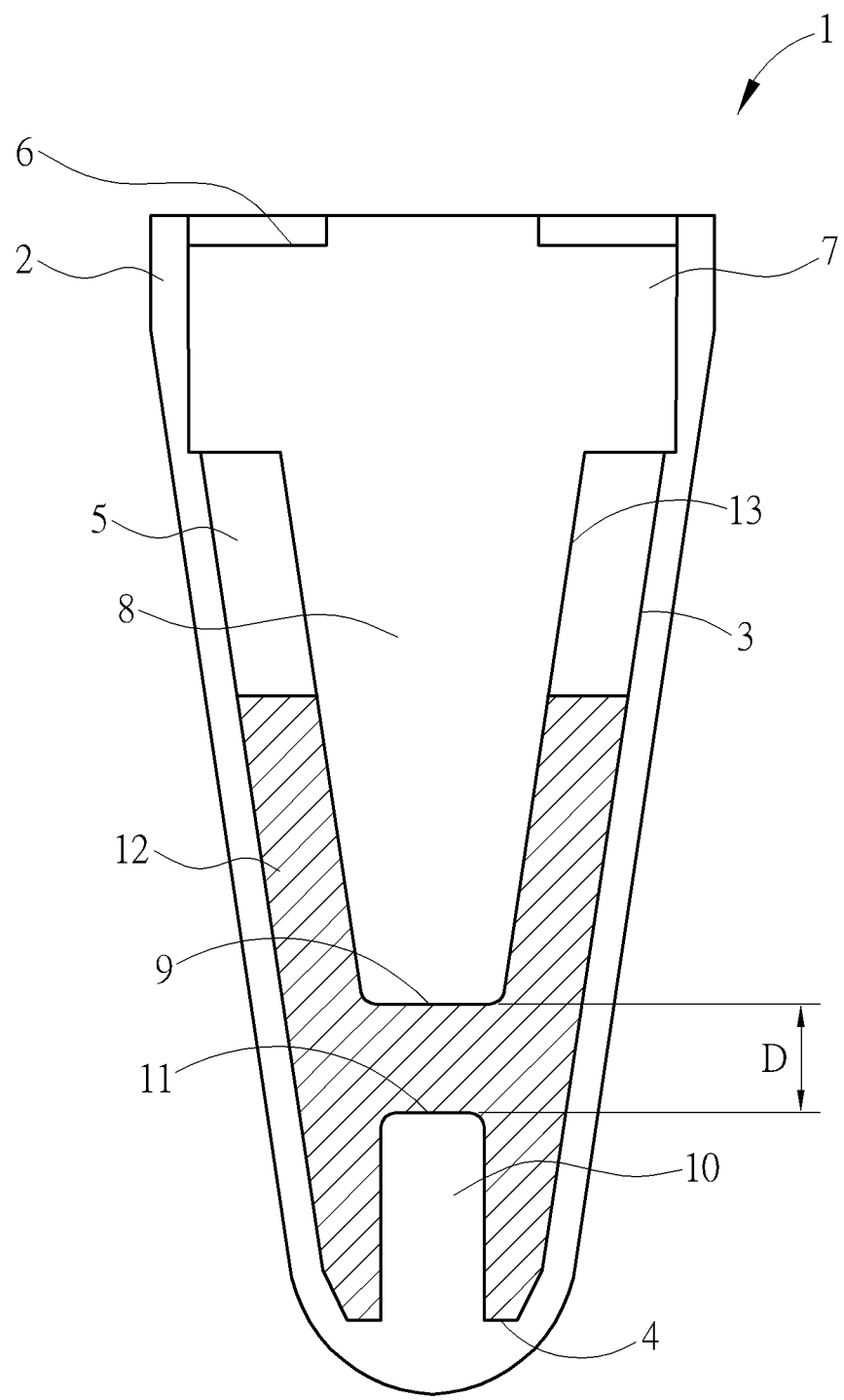
FIG. 1 is a schematic structural diagram of a sample tube according to an embodiment of the present invention.

Please refer to FIG. 1, which is a schematic structural diagram of a sample tube 1 according to an embodiment of the present invention. As shown in FIG. 1, a sample tube 1 for polymerase chain reaction (PCR) includes a sample tube body 2 and an extension member 10. The sample tube body 2 has an annular side wall 3 and a bottom wall 4 connected to the annular side wall 3. The annular side wall 3 and the bottom wall 4 form an accommodating space 5 for accommodating a reaction mixture 12. The extension member 10 extends from the bottom wall 4 to the accommodating space 5. The reaction mixture 12 immerses the extension member 10 during PCR, such that the light beam of a light source (e.g., but not limited to, excitation beam) enters the reaction mixture 12 via the bottom and the bottom wall 4 of the sample tube 1 and the extension member 10 sequentially.

In this structure, because the extension member 10 extends from the bottom of the sample tube body 2 to the accommodating space 5, such that the central portion of the bottom of the sample tube 1 is raised, thereby increasing the contact area between the annular side wall 3 of the sample tube 1 and the reaction mixture 12, so as to increase the ratio of the heating area of the sample tube 1 to the volume of the reaction mixture 12. As a result, in the present invention, the contact area between the annular side wall 3 and the reaction mixture 12 is increased because of the extension member 10, and thus the heating/cooling rate during denaturation, annealing, extension steps of each PCR cycle is increased, so as to further reduce the reaction time of the PCR, thereby substantially increasing heating and heat dissipation efficiency.

On the other hand, the sample tube 1 further includes a sample tube cap 6. The sample tube cap 6 includes a cover 7 for sealing the accommodating space 5 and an extension member 8 extending from the cover 7. The sample tube cap 6 is inserted into the sample tube body 2, such that the extension member 8 is arranged to face the extension member 10, and the reaction mixture 12 exists between the extension members 8 and 10. In detail, the extension member 10 has a top surface 11, and the extension member 8 has a top surface 9. There is a distance D ranged between the top surface 11 and the top surface 9, so that there is the reaction mixture 12 in between and the liquid level of the reaction mixture 12 is higher than the position of the top surface 9 in height, or the liquid level of the reaction mixture 12 is just in contact with the top surface 9. The extension member 8 has a side wall 13 in contact with the top surface 9, and the side wall 13 is arranged to face the annular side wall 3. It should be noted that the extension member 8 may be made of an opaque material, or the extension member 8 is made of a transparent material and the top surface 9 has an opaque property, so that the light beam of the light source enters the reaction mixture 12 via the bottom and the bottom wall 4 of the sample tube 1 and the extension member 10 sequentially without passing through the extension member 8. In addition, the side wall 13 and the annular side wall 3 are preferably arranged in parallel for ease of use (for example, it is convenient for the sample tube cap 6 having the cover 7 and the extension member 8 to be inserted into the sample tube body 2), but the side wall 13 and the annular side wall 3 can also be arranged to face each other by other methods. Sample tube cap 6 and sample tube body 2 may be integrally formed or may be two independent components. When being integrally formed, the sample tube cap 6 and the sample tube body 2 are connected with each other by a conventional linkage component (such as a plastic strip; not shown in FIG. 1), and sample tubes 1 are manufactured by procedures such as plastic injection. When being two independent components, the sample tube cap 6 is inserted into the sample tube body 2 via a conventional manner such as spiral, plug, and buckle.

In this structure, because the extension member 10 extends from the bottom of the sample tube body 2 to the accommodating space 5, the extension member 8 extends from the cover 7, there is a reaction mixture 12 residing between the extension members 8 and 10, and the side walls 13 of the extension member 8 is arranged to face the annular side wall 3 when the sample tube cap 6 is inserted into the sample tube body 2. Therefore, when the extension member 8 is inserted into the sample tube body 2, the reaction mixture 12 is distributed in an H shape in the sample tube 1 as viewed from the side of the sample tube 1, thereby reducing the contact area between the reaction mixture 12 and air within the sample tube 1. As a result, in the present invention, the cover 7 is scaled up by configuring the extension member 8 (i.e. a plug) thereon to increase the contact area between the annular side wall 3 of the sample tube 1 and the reaction mixture 12, and to reduce the contact area between the reaction mixture 12 and air within the sample tube 1, so as to avoid bubble formation during the heating process of the PCR, disturbing optical signals and affecting the efficiency of the PCR.

It is worth noting that the main spirit of the present invention is to extend the bottom of the sample tube body 2 with the extension member 10 to increase the contact area between the sample tube body 2 and the reaction mixture 12, so as to improve heating and heat dissipation efficiency and reduce reaction time. Besides, the present invention may reduce the contact area between the reaction mixture 12 and air within the sample tube 1 by lengthening the cover 7 using the extension member 8 (i.e. a plug), to avoid bubble formation. Those skilled in the art may make modifications or alterations accordingly, which are not limited thereto. For example, the sample tube 1 may be used for any PCR device and subjected to repetitively heating and cooling, but may also be used for other reactions. For instance, the sample tube 1 may be placed in a heater for warming or a water bath for thermostat reaction. Furthermore, the extension member 10 illustrated in FIG. 1 increases the thickness of the center of the bottom of the sample tube 1, to maximize the contact area between the reaction mixture 12 and the annular side wall 3 of the sample tube 1. In other embodiments, other areas of the bottom of the sample tube 1 may be thickened or multiple extension members are arranged on the bottom, to increase the contact area. In addition, in the above embodiments, shapes of the extension member 10 and the extension member 8 are individually a cylinder, a trapezoidal cylinder, a rectangular cylinder or a cubic cylinder. In other embodiments, the shapes of the extension member 10 and the extension member 8 may be other shapes according to practical requirements, and are not limited as long as the desired functionality can be achieved.

Figure 2:
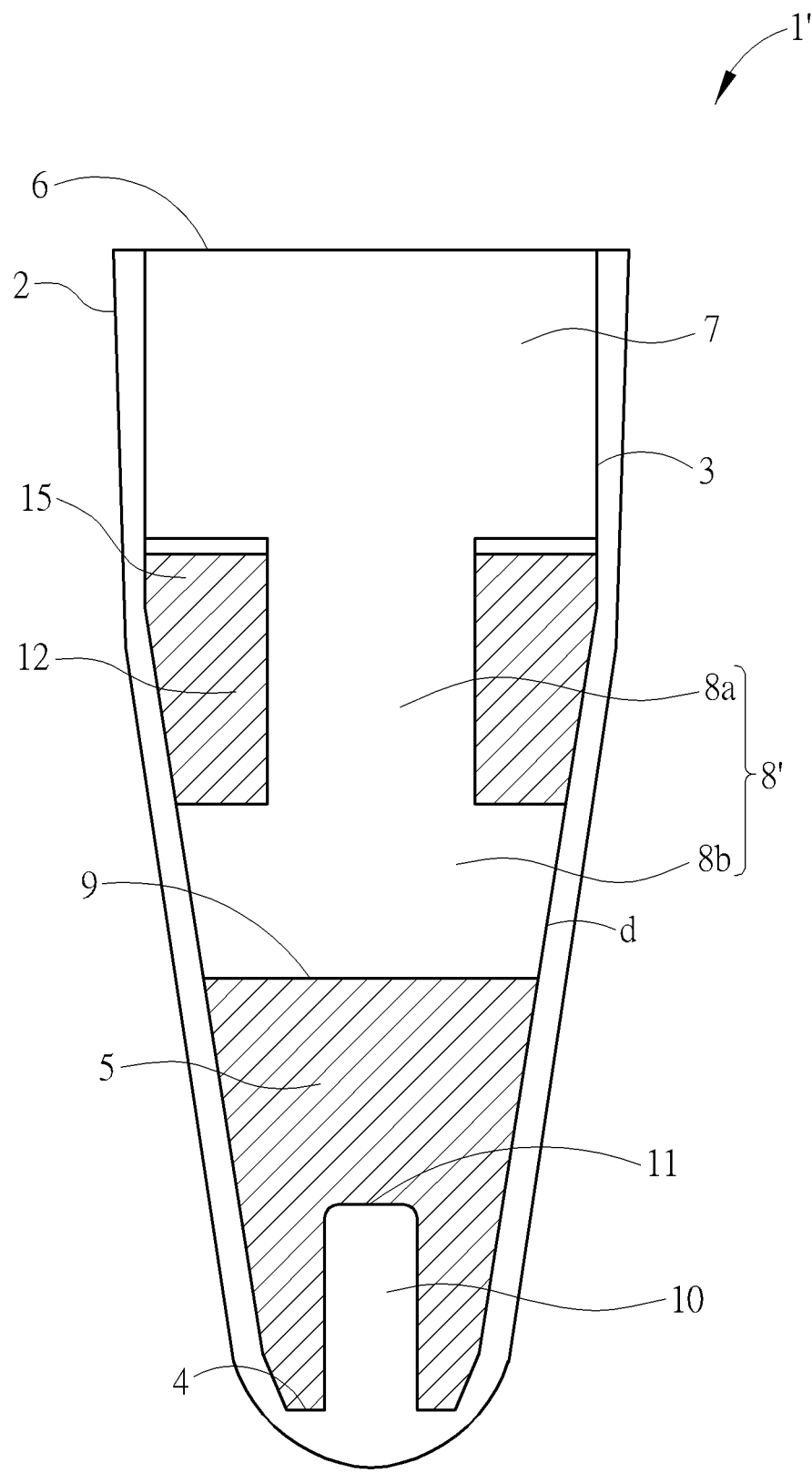
FIG. 2 is a schematic structural diagram of a sample tube according to another embodiment of the present invention.

For example, please refer to FIG. 2, which is a schematic structural diagram of a sample tube 1' according to an embodiment of the present invention. As shown in FIG. 2, the sample tube 1' and the sample tube 1 are substantially similar, and thus elements with similar functions and structures are denoted by same symbols. A main difference between the sample tube 1' and the sample tube 1 is that, compared to a cylindrical extension member 8 illustrated in FIG. 1, an extension member 8' of the sample tube 1' includes a neck 8a and a shoulder 8b. The neck 8a is located between the cover 7 and the shoulder 8b and is connected to the cover 7 and the shoulder 8b, individually. Moreover, the shoulder 8b is arranged to face the extension member 10. In this case, after the sample tube cap 6 seals the sample tube body 2, there is a gap d between the shoulder 8b and the annular side wall 3, and when the shoulder 8b is inserted to contact with the reaction mixture 12, a portion of the reaction mixture 12 passes the gap d and enters a space 15 surrounded by the cover 7, the neck 8A, the shoulder 8b and the annular side wall 3.

Specifically, the length of the neck 8a and the width of the shoulder 8b of the extension member 8' (i.e. the plug) which extends from the cover 7 can be appropriately designed, so that during the sealing process of the sample tube cap 6 into the sample tube body 2, the gap d between the shoulder 8b and the annular side wall 3 gradually narrows to approach zero, and the sample tube body 2 is almost closed after sealing. In other words, during the sealing process of the sample tube cover 6 into the sample tube body 2 to gradually narrow gap d, gas (i.e., for venting) and the excess reaction mixture 12 are transferred to the space 15 where almost no reaction happened and no signals would be detected. As a result, via the appropriate structural design of the extension member 8', the present invention may adaptively control the volume of the reaction mixture 12 for the temperature cycles of the PCR, to simultaneously improve the reaction efficiency and consistency of temperature control conditions, and reduce the disturbance of reaction and optical signal caused by the exposure to air.

Figure 3:
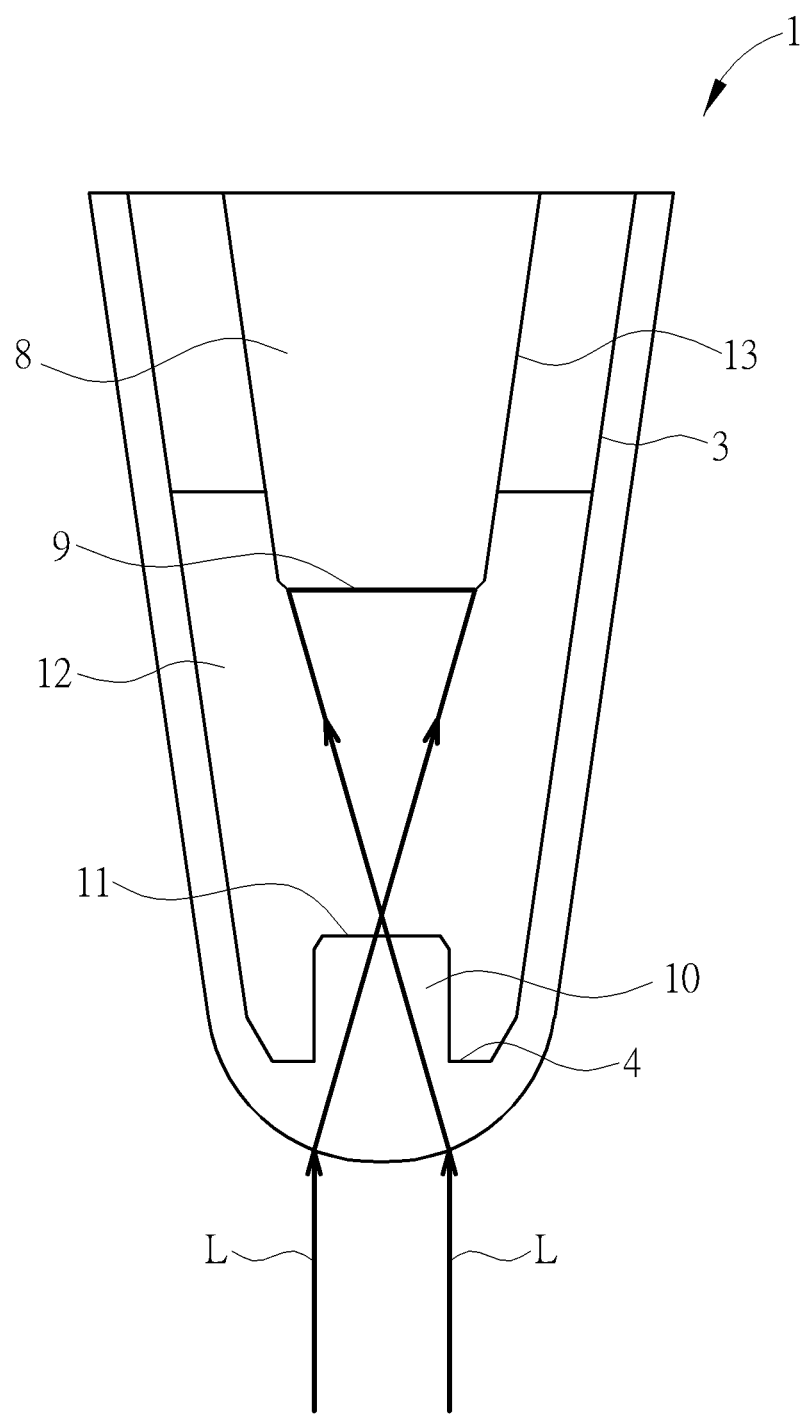
FIG. 3 is a schematic diagram of applying excitation beam on the sample tube shown in FIG. 1 according to an embodiment of the present invention.

In addition, please continuously refer to FIG. 1. The extension member 10 shown in FIG. 1 may be made of a transparent material, and the bottom wall 4 function as a converging lens; alternatively, the bottom wall 4 and the extension member 10 are integrally formed, and the combination of the bottom wall 4 and the extension member 10 can converge the light beam; otherwise, the extension member 10 is a light guiding member such as a light converging lens or a light guide cylinder. In this case, the bottom wall 4, the extension member 10 or the combination thereof converges or guides the light beam (excitation beam) of the light source, such that the light beam of the light source is more focused and optical noise can be reduced. For example, please refer to FIG. 3, which is a schematic diagram of applying excitation beam on the sample tube 1 of FIG. 1 according to an embodiment of the present invention. As shown in FIG. 3, the combination of the bottom wall 4 and the extension member 10 may converge or guide the light beam L of a light source (not shown), so that the light path of the light beam L in the reaction mixture 12 of the sample tube 1 is shortened, and the light beam L is also more focused, optical signals desired for measurement are less susceptible to the disturbance of the reaction mixture 12, thereby reducing optical noise. That is, when the light beam L of the light source enters the reaction mixture 12 via the bottom and the bottom wall 4 of the sample tube 1 and the extension member 10 sequentially, the present invention can effectively reduce the optical noise in the optical path caused by the disturbance of the reaction mixture 12.

In summary, the present invention elongates the bottom of the sample tube body 2 using the extension member 10, to increase the contact area between the annular side wall 3 and the reaction mixture 12, so as to increase the heating and heat dissipation efficiency and reduce the reaction time. Besides, by lengthening the cover 7 using the extension member 8 (i.e. a plug), the present invention may reduce the contact area between the reaction mixture 12 and the air, to avoid bubble formation. In addition, via the appropriate structural design of the extension member 8', the present invention may control the volume of the reaction mixture 12 for reaction, and reduce the exposure to air. Furthermore, the bottom wall 4, the extension member 10 or the combination thereof converges or guides the light beam (excitation beam) of the light source, such that the present invention may reduce the optical noise in the optical path caused by the disturbance of the reaction mixture 12.

The sample tubes 1, 1' disclosed, but not limited to, in the embodiments of the present invention are suitable for PCR devices compatible therewith, and are also suitable for PCR and quantitative analysis after DNA amplification using such PCR devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sample tube for a polymerase chain reaction (PCR), comprising:
   a sample tube body, having an annular side wall and a bottom wall being a converging lens and connected to the annular side wall, wherein the annular side wall and the bottom wall form an accommodating space for accommodating a reaction mixture;
   a first extension member, being made of a transparent material, being a light converging lens, and extending from the bottom wall to the accommodating space, wherein the reaction mixture immerses the first extension member during the PCR, such that a light beam of a light source enters the reaction mixture via the bottom wall of the sample tube and the first extension member sequentially; and
   a sample tube cap, comprising a cover for sealing the accommodating space, and a second extension member extending from the cover, wherein the sample tube cap is inserted into the sample tube body, such that the second extension member is arranged to face the first extension member to allow the reaction mixture existing between the first extension member and the second extension member,
   wherein a second top surface of the second extension member has an opaque property;
   wherein a side wall of the second extension member is arranged in parallel to the annular side wall;
   wherein the second extension member comprises a neck and a shoulder, the neck is located between the cover and the shoulder and is connected to the cover and the shoulder, respectively, and the shoulder is arranged to face the first extension member;
   wherein the bottom wall and the first extension member are integrally formed to converge the light beam;
   wherein when the second extension member is inserted into the sample tube body, the accommodating space is represented as an H shape in the sample tube as viewed from a side of the sample tube, and the reaction mixture is distributed in the H shape in the sample tube.

2. The sample tube of claim 1, wherein the second extension member is made of an opaque material.

3. The sample tube of claim 2, wherein the first extension member has a first top surface, and there is a distance between the first top surface and the second top surface, and the first extension member is a light guiding element extension member is the light guiding element.

4. The sample tube of claim 1, wherein the second extension member is made of a transparent material.

5. The sample tube of claim 3, wherein the second extension member has the side wall in contact with the second top surface, and the side wall is arranged to face the annular side wall.

6. The sample tube of claim 3, wherein shapes of the first extension member and the second extension member are respectively one selected from a group consisting of a cylinder, a trapezoidal cylinder, a rectangular cylinder and a cubic cylinder.

7. The sample tube of claim 1, wherein after the sample tube cap seals the sample tube body, there is a gap formed between the shoulder and the annular side wall to allow a portion of the reaction mixture to enter a space surrounded by the cover, the neck, the shoulder and the annular side wall during the shoulder is inserted and in contact with the reaction mixture.

8. The sample tube of claim 1, wherein the sample tube cap and the sample tube body are integrally formed.

9. The sample tube of claim 1, wherein the first extension member is a light guide cylinder.

10. The sample tube of claim 1, wherein a liquid level of the reaction mixture is in contact with a second top surface of the second extension member in the accommodating space.

* * * * *